United States Patent
Yamashita et al.

(10) Patent No.: US 6,258,299 B1
(45) Date of Patent: Jul. 10, 2001

(54) DEVICE FOR MOLDING OPHTHALMIC LENS MATERIAL AND METHOD OF MOLDING THEREWITH

(75) Inventors: Keiji Yamashita; Tatsuya Ojio; Tohru Kawaguchi, all of Kasugai (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 09/319,960
(22) PCT Filed: Oct. 13, 1998
(86) PCT No.: PCT/JP98/04601
§ 371 Date: Jun. 14, 1999
§ 102(e) Date: Jun. 14, 1999
(87) PCT Pub. No.: WO99/19128
PCT Pub. Date: Apr. 22, 1999

(30) Foreign Application Priority Data

Oct. 15, 1997 (JP) ................................... 9-281858

(51) Int. Cl.[7] ................................... B29D 11/00
(52) U.S. Cl. ................ 264/1.1; 249/117; 264/2.5; 264/102; 425/808
(58) Field of Search ................. 264/1.1, 1.36, 264/1.38, 2.5, 101, 102; 425/808, 174.4; 249/117

(56) References Cited

U.S. PATENT DOCUMENTS

| | | | |
|---|---|---|---|
| 4,806,287 | * 2/1989 | Sulc et al. | 425/808 |
| 4,874,561 | * 10/1989 | Spector | 425/808 |
| 5,160,749 | * 11/1992 | Fogarty | 425/808 |
| 5,458,819 | * 10/1995 | Chirila et al. | 425/808 |
| 5,762,836 | * 6/1998 | Bos et al. | 425/808 |
| 5,904,746 | * 5/1999 | Okada | 425/808 |

FOREIGN PATENT DOCUMENTS

| | | |
|---|---|---|
| 1-184111 | 7/1989 | (JP) . |
| 1-316226 | 12/1989 | (JP) . |
| 4-290706 | 10/1992 | (JP) . |

* cited by examiner

*Primary Examiner*—Mathieu D. Vargot
(74) *Attorney, Agent, or Firm*—Armstrong, Westerman, Hattori, McLeland & Naughton, LLP (57) ABSTRACT

A device comprises a lower die 6 composed of a lower die base portion and a lower die columnar portion of which tip surface is formed with a lower die molding surface corresponding to one surface of an ocular lens material; an upper die 8 composed of an upper die base portion that is fitted into an upper portion of a hollow hole of the cylindrical main body for parting the hollow hole into two, forming an intermediate chamber 18 between itself and the lower die base portion into which the monomer composition is filled, and forming an exterior accumulating chamber 20 on a side of an upper aperture of the hollow hole into which the monomer composition is accumulated, and an upper die columnar portion of which tip surface is formed with an upper die molding surface corresponding to another surface of the ocular lens material, wherein a molding cavity 22 having a communicating portion 24 is formed between the upper die molding surface and the lower die molding surface; and not less than three piercing holes 16 provided as to pierce the upper die base portion of the upper die in a vertical direction and as to be positioned at equal intervals around the upper die columnar portion. Simplification of the die arrangement of the molding device for molding ocular lens materials through polymerization in a mold can be effectively achieved, and superior transcriptability and uniform lens shape can be realized.

30 Claims, 8 Drawing Sheets

DEVICE FOR MOLDING OPHTHALMIC LENS MATERIAL AND METHOD OF MOLDING THEREWITH

TECHNICAL FIELD

The present invention relates to a device for molding ocular lens material and a molding method employing the same. More particularly, the present invention relates to a device for molding ocular lenses such as intraocular lenses or contact lenses or for molding ocular lens material of shapes corresponding to precursors thereof by polymerizing monomer compositions for providing polymer products constituting these articles within a molding cavity, and it also relates to a method for molding targeted ocular lens material by performing polymerizing of specified monomer compositions within the molding cavity by employing the above device.

BACKGROUND ART

It has been conventionally known that ocular lenses such as intraocular lenses or contact lenses as well as ocular lens material of shapes corresponding to precursor thereof might be formed through various methods such as mechanical processing such as cutting or grinding materials of polymer products constituting these articles having specified shapes (rod-like bodies, blocks, etc.). Alternatively, they might be formed through so-called mold polymerization in which monomer compositions providing polymer products are polymerized within a molding cavity of a specified molding device (molding dies) to obtain a molded article having a shape corresponding to the molding cavity.

Figure 1:
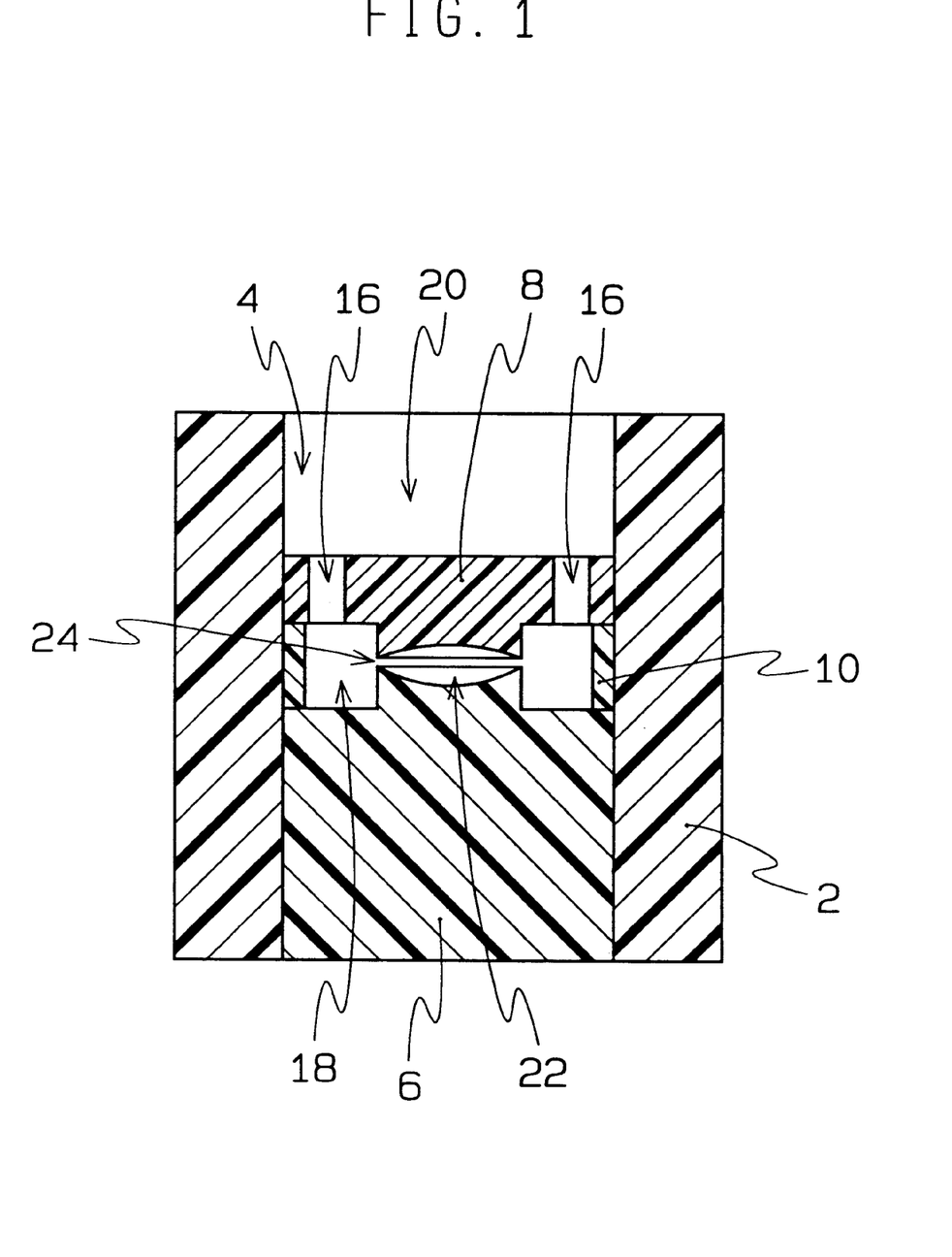
FIG. 1 is a longitudinal sectional explanatory view showing an example of a device for molding ocular lens material according to the present invention.
Figure 2A:
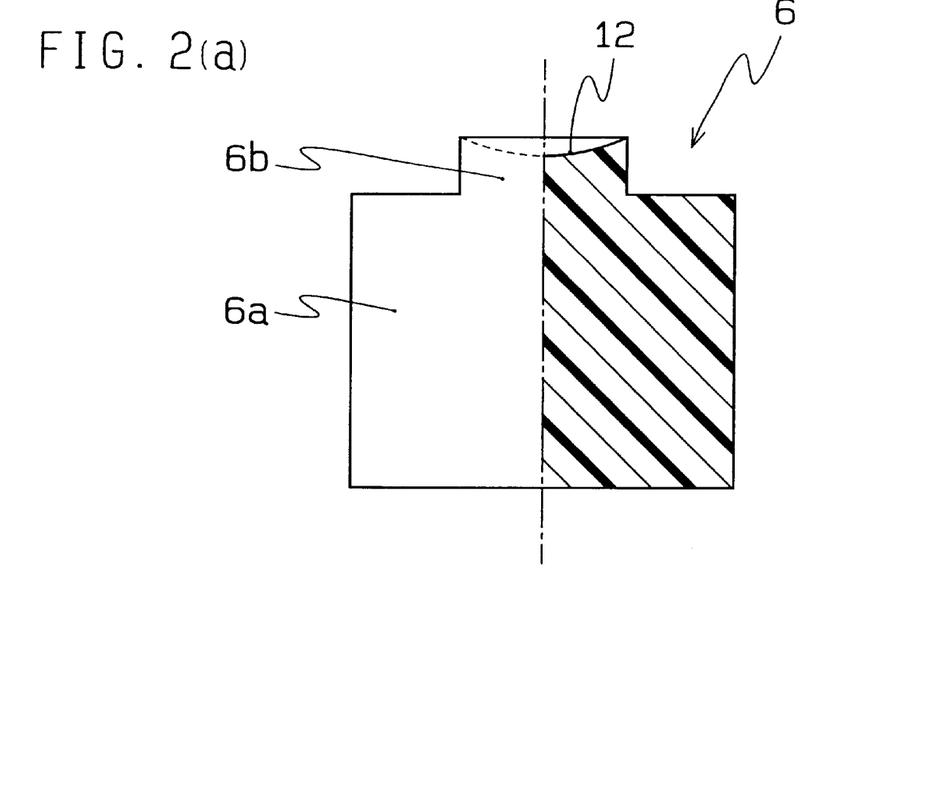
Figure 2B:
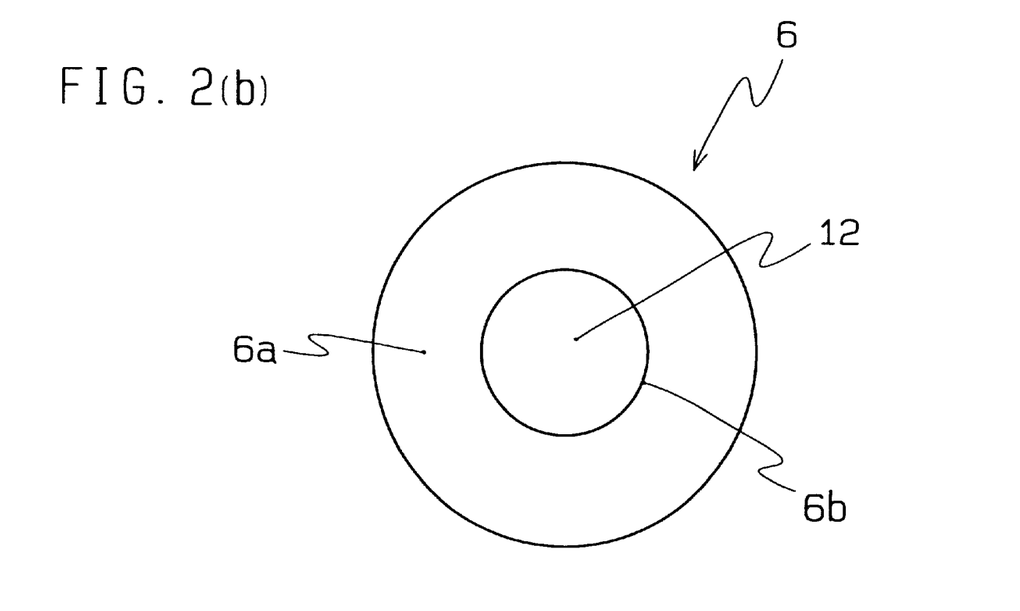
Figure 3A:
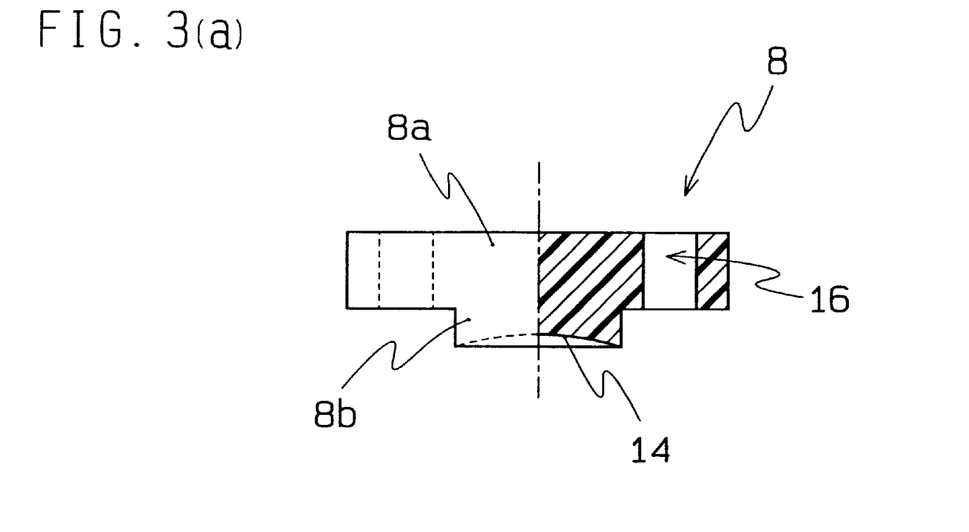
Figure 3B:
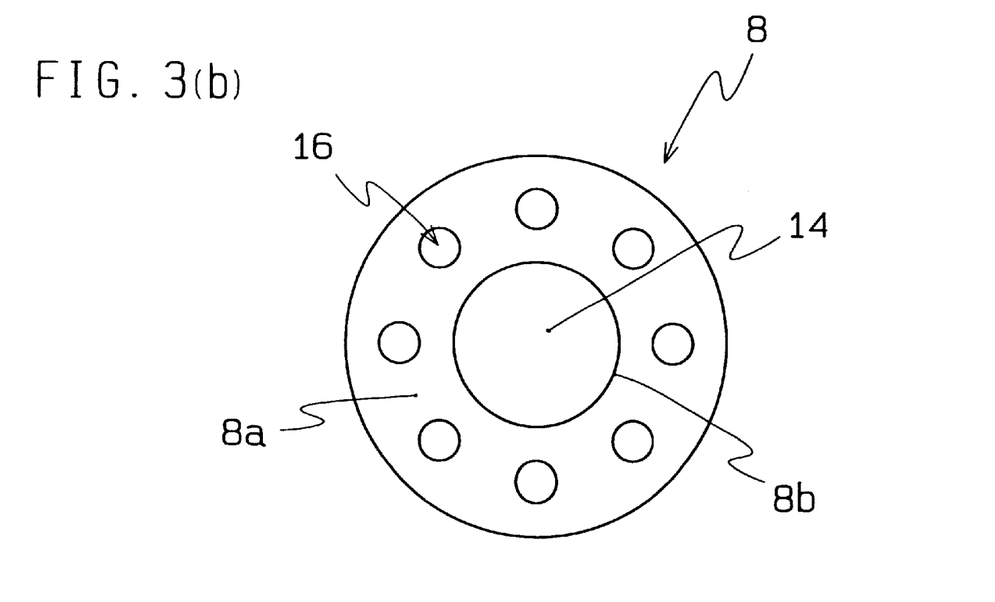

Japanese Unexamined Patent Publication No. 52168/1995 discloses one example for obtaining targeted ocular lens material through such a mold polymerization method. As shown in FIGS. 1 to 3, this publication discloses a method for obtaining ocular lens material of polymer products by immersing molding dies composed of an upper die and a lower die within a monomer solution accumulated in a vessel and by polymerizing the monomer solution within a molding cavity formed between the upper die and the lower die through a radiant flux introduced through the upper die, thereby obtaining ocular lens material of polymer product corresponding to the shape of the molding cavity. In this invention, the upper die needs to be reliably shielded such that leakage of radiant flux that is passed through the upper die does not occur so as to prevent polymerization of monomer solution being present in the periphery of the molding dies, and the upper die needs to be detached from the lower die after the polymerization. Such various devises as explained above that need to be taken various designs for the molding dies result in a difficult die arrangement. Additionally, since molded ocular lens material need to be taken out from the monomer solution after the polymerization, residues of such monomers need to be removed from the ocular lens material wherein such operations might be quite troublesome. Still further, one or more of monomers might volatilize from the monomer solution residing in the periphery of the molding dies at the time of polymerization, whereby variations in the composition of the monomer solution and thus in the composition of the obtained ocular lens material would be caused.

Further, the method and device for manufacturing optical lenses as disclosed in Japanese Unexamined Patent Publication No. 256658/1995 employs dies for molding that can be repetitively utilized wherein either one of two mold halves (half dies) is made to be moveable like a piston and wherein a specified molding cavity is formed between the two mold halves. In order to obtain targeted contact lenses (optical lenses), the molding cavity is filled with the monomer composition wherein air within the molding cavity is eliminated while injecting a specified monomer composition into the molding cavity formed between the two mold halves by means of, for instance, an injecting nozzle, for polymerization. Also in this method, the arrangement of a moving mechanism for one of the mold halves and an injection mechanism for monomer solution makes the die arrangement complicated. Further, shrinkage accompanying the polymerization of monomer solution within the molding cavity would be difficult to be effectively compensated since a capacity of a flow outlet at which the injected monomer solution is substantially resident is insufficient, and consequently, the flowability of the monomer solution within the molding cavity becomes poor so that the shapes of obtained contact lenses might not be uniform. In other words, supply of monomer solution to the molding cavity interior, that is, the molding surfaces, becomes insufficient so that unevenness of surfaces of obtained molded articles (contact lenses) might be caused, resulting in failure of targeted lens surfaces.

The present invention has been made in view of such circumstances, and its subject for solution lies in the point to achieve simplification of die arrangement in a device for molding ocular lens material through mold polymerization, to improve the flowability of monomer compositions of the ocular lens components at the time of polymerization shrinkage, and to make surfaces of the obtained ocular lens materials uniform by improving the transcriptability of the molding cavity interior (molding surface) through supplying ocular lens components to the molding cavity in an uniform manner.

DISCLOSURE OF THE INVENTION

In order to solve such problems, the present invention provides a device for molding ocular lens material which is (a) a device for molding ocular lens or ocular lens material of shapes corresponding to precursors thereof by polymerizing liquid monomer composition of polymer products constituting these articles within a molding cavity, characterized in that it comprises (b) a cylindrical main body having a hollow hole in which the monomer composition is accumulated, (c) a lower die composed of a lower die base portion disposed in a lower portion of the hollow hole as to close a lower aperture of the hollow hole of the cylindrical main body, and a lower die columnar portion that is erected as to extent upward from an upper surface of the lower die base portion within the hollow hole and of which tip surface is formed with a lower die molding surface corresponding to one surface of the ocular lens material, wherein a periphery of the lower die columnar portion is spaced, (d) an upper die composed of a plate-like upper die base portion that is fitted into an upper portion of the hollow hole of the cylindrical main body for parting the hollow hole into two, forming an intermediate chamber between itself and the lower die base portion of the lower die into which the monomer composition is filled, and forming an exterior accumulating chamber on a side of an upper aperture of the hollow hole into which the monomer composition is accumulated, and an upper die columnar portion that is erected as to extent downward from a lower surface of the upper die base portion within the hollow hole and of which tip surface is formed with an upper die molding surface corresponding to another surface of the ocular lens material, wherein a periphery of the upper die columnar portion is spaced, wherein the molding cavity is formed between the upper die molding surface of the upper die columnar portion and the lower die molding surface of the lower die columnar portion, and wherein a communicating portion is formed over a whole circumferential of an exterior circumferential portion of the molding cavity through which the monomer composition is introduced from the intermediate chamber to the molding cavity, and (e) not less than three piercing holes for introducing the monomer composition from the external accumulating chamber to the intermediate chamber that are provided as to pierce the upper die base portion of the upper die in a vertical direction and as to be positioned at equal intervals around the upper die columnar portion.

In the device for molding ocular lens material according to the present invention, the monomer composition is introduced into the intermediate chamber through not less than three piercing holes provided in the upper die base portion of the upper die, and is further introduced into the molding cavity for filling. On the other hand, deaeration of aerous bodies within the intermediate chamber or molding cavity is performed through these piercing holes, whereby these piercing holes concurrently serve as introducing holes and deaeration holes of monomer. Since it is not required to provide any special shielding means or moving mechanism as it was required in the prior art, simplification of the die arrangement is advantageously achieved. Additionally, thanks to the arrangement of not less than three piercing holes around the upper die columnar portion of the upper die at equal intervals and supply of monomer composition through these holes, supply of monomer composition is made uniform, while the flowability of the monomer composition of the ocular lens components at the time of polymerization shrinkage can be effectively improved through the presence of the intermediate chamber around the molding cavity that is filled with monomer composition. With this arrangement, ocular lens components can be uniformly supplied into the molding cavity, whereby surfaces of obtained ocular lens material can be made uniform.

According to one preferred embodiment of the device for molding ocular lens material according to the present invention, a covering lid means is provided as to cover the upper aperture of the hollow hole of the cylindrical main body, whereby the external accumulating chamber formed outside the upper die base portion of the upper die is shielded from the exterior (atmosphere). The provision of such a covering lid means can effectively prevent volatilization of monomer at the time of polymerization and thus prevent changes in the composition of monomer compositions. In this manner, ocular lens material of uniform composition can be advantageously obtained.

According to another preferred embodiment of the device for molding ocular lens materials according to the present invention, a space in which aerous bodies might reside is formed between the covering lid means and a liquid surface of the monomer composition that is accumulated in the external accumulating chamber. The presence of such space can ease changes in pressure that are caused at the time of polymerization, whereby neutralization of polymerization shrinkage can be more effectively achieved.

The device for molding ocular lens material according to the present invention can employ advantageously an arrangement of disposing cylindrical spacers in the hollow hole of the cylindrical main body such that they are positioned between the upper die base portion of the upper die and the lower die base portion of the lower die, so that a distance between the upper die molding surface at the tip of the upper die columnar portion and the lower die molding surface at the tip of the lower die columnar portion that are opposed with respect to each other is regulated.

The present invention also relates to a molding method employing the above described device for molding ocular lens material, in which the above described molding device according to the present invention is employed for performing molding of ocular lens or ocular lens material of shapes corresponding to precursors thereof by polymerizing liquid monomer compounds of polymer products constituting these articles within a molding cavity, wherein the monomer composition is filled into the molding cavity and intermediate chamber by supplying the monomer composition into the hollow hole of the cylindrical main body so as to introduce the monomer composition from the external accumulating chamber to the intermediate chamber through the piercing holes and from the intermediate chamber to the molding cavity through the connecting portion and to accumulate the monomer composition into the external accumulating chamber, wherein polymerization process is performed to polymerize the monomer composition residing in the molding cavity, intermediate chamber, and external accumulating chamber to obtain an uniform polymerized object, and wherein the ocular lens material formed in the molding cavity is taken out from the polymerized object thereafter.

In the method for molding ocular lens material according to the present invention, the polymerization process is preferably performed under a condition in which a space in which aerous bodies might reside, more preferably a closed space parted from the exterior is formed above a liquid surface of the monomer composition accumulated in the external accumulating chamber, whereby changes in pressure that are caused at the time of polymerization might be eased to achieve neutralization of polymerization shrinkage in a more effectively manner.

According to another preferred embodiment of the method for molding ocular lens material according to the present invention, the intermediate chamber and molding cavity are maintained at a decompressed condition after being introduced with the monomer composition and preceding the polymerization processes, whereby at least bubbles residing in the molding cavity might be removed to eliminate generation of deficiencies of molding due to the presence of such bubbles.

BRIEF DESCRIPTION OF THE DRAWINGS

FIG. 2 is a view of structure of a lower die in the molding device of FIG. 1 wherein (a) is a half-cut explanatory view of the lower die and (b) an explanatory plan view of the lower die;

FIG. 3 is a view of details of an upper die as employed in FIG. 1 wherein (a) is a half-cut explanatory view of the upper die, and (b) an explanatory bottom view of the upper die;

FIG. 5 is a sectional explanatory view showing arrangements of an upper covering lid of a die main body arranged in the molding device according to the present invention wherein (a) to (d) are all views showing sectional forms of various covering lid members;

BEST MODE FOR CARRYING OUT THE INVENTION

The device for molding ocular lens material and the molding method employing the same according to the present invention will now be explained in details with reference to the accompanying drawings.

First, in a molding device according to the present invention as shown in FIG. 1, 2 denotes a cylindrical die main body in which hollow hole 10 there is assembled a targeted molding means (molding dies) through fitting while maintaining a specified remote relationship with respect to each other.

More particularly, a lower die 6 that forms a part of the molding device is composed of, as shown in FIG. 1 and FIG. 2, a lower die base portion 6a which assumes a thick, disk-shaped or is columnar, and a columnar lower die columnar portion 6b that is erected from an upper surface of the base portion as to extend upward by a specified length, wherein a tip surface of the lower die columnar portion 6b is formed with a lower die molding surface 12 corresponding to one surface of targeted ocular lens material and wherein a periphery of the lower die columnar portion 6b is spaced. Further, as it is clear from FIG. 1, the lower die 6 is liquid-tightly fitted into a lower portion of a hollow hole 4 of the die main body 2 at its lower die base portion 6a whereby a lower aperture of the hollow hole 4 is sealed.

On the other hand, an upper die 8 is composed, as shown in FIG. 1 to FIG. 3, of a disc-shaped upper die base portion 8a and a columnar upper die columnar portion 8b that is erected from a lower surface of the base portion as to extend downward by a specified length, wherein a tip surface of the upper die columnar portion 8b is formed with an upper die molding surface 14 corresponding to another surface of the targeted ocular lens material and wherein a periphery of the upper die columnar portion 8b is spaced.

In addition, eight piercing holes 16 are arranged at the upper die base portion 8a of the upper die 8 so as to pierce the same in a vertical direction and as to be disposed at equal distances around the upper die columnar portion 8b. In order to achieve the purpose of the present invention, the number of the piercing holes shall not be less than three, since in case of piercing holes less than this value, flowing of monomer composition at the time of polymerization shrinkage cannot be sufficiently achieved, whereby the transcriptability of the lower die molding surface 12 or the upper die molding surface 14 becomes poor, and there might be caused problems that molded surfaces of ocular lens materials to be obtained would assume concave or convex portions to result in uneven shapes of surfaces.

Then, the upper die 8 is so arranged that its upper die columnar portion 8b is fitted into an upper portion of the hollow hole 4 of the die main body 2 at its upper die base portion 8a so that the columnar portion opposes the lower die columnar portion 6b of the lower die 6, that an intermediate chamber 18 is formed between itself and the lower die base portion 6a of the lower die 6 which separates the hollow hole 4 into two and into which the monomer composition is filled, and that an external containing chamber 20 is formed on a side of an upper aperture of the hollow hole 4 into which the monomer composition is contained. By this fitting of the upper die 8, a molding cavity 22 is formed between the lower die molding surface 12 formed at the tip surface of the lower die columnar portion 6b of the opposing lower die 6 and the upper die molding surface 14 formed at the tip surface of the upper die columnar portion 8b of the upper die 8 for providing targeted ocular lens material. It should be noted that the thickness of the molding cavity 22 in the vertical direction is regulated by a spacer member 10 interposed between the lower die 6 and upper die 8, and more particularly, between the lower die base portion 6a and the upper die base portion 8a, whereby a communicating portion 24 is formed over the whole circumference of the molding cavity 22 for communicating the molding cavity 22 with the intermediate chamber 18 formed around the lower die base portion 6a and the upper die base portion 8a.

Since the molding cavity 22 formed between the lower die base portion 6b of the lower die 6 and the upper die base portion 8b of the upper die 8 provides targeted ocular lens material by polymerization of the monomer composition at this position, it assumes a shape corresponding to such targeted ocular lens material, and in order to provide at least optical portions (lens portions) to the ocular lens material, it is generally formed to assume a shape corresponding to at least the optical portion. Therefore, the lower die molding surface 12 or upper die molding surface 14 that make up the molding cavity 22 are arranged to be capable of at least forming both surfaces of the optical portion of the ocular lens material.

Since all of the die main body 2, lower die 6, upper die 8 and the spacer member 10 that constitute the above described molding device contact the monomer composition, these might be formed of any material so long as it is not eroded by such monomer composition. Examples thereof are fluororesin represented by polytetrafluoroethylene, olefin group resin such as polypropylene or polyethylene, or polyacetal resin. The material for the die main body 2 might also be metal. Especially, since ocular lens material formed within the molding cavity 22 is generally taken out therefrom through cutting a portion of outer diameter of the accumulated object including the lower die 6 and the upper die 8 as it will be described later, the lower die 6, upper die 8 and the spacer member 10 are preferably formed of resin.

Figure 4:
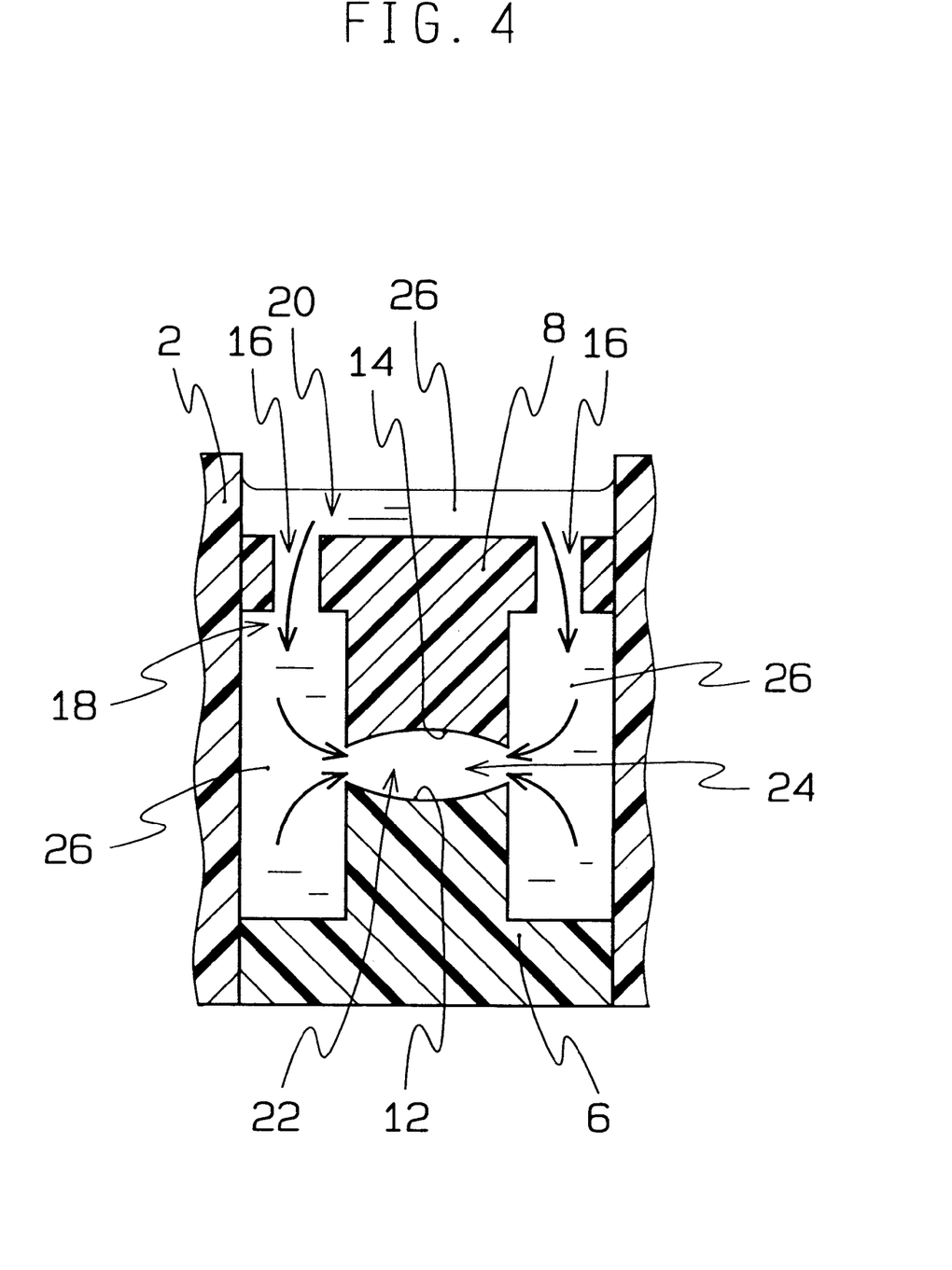
FIG. 4 is a sectional explanatory view showing flowing forms of the filled monomer composition in a molding device similarly arranged as that of FIG. 1.

Using the molding device arranged as described above, a liquid monomer composition is filled, as shown in FIG. 4, into the molding cavity 22 and the intermediate chamber 18 for providing a polymer product constituting the ocular lens material, and the monomer composition is also charged into the external containing chamber 20 for polymerization. Accompanying the polymerization shrinkage that is caused during the progress of polymerization, the monomer composition 26 within the intermediate chamber 18 is effectively introduced into the molding cavity 22 through the communicating portion 24, and the monomer composition 26 within the external communicating chamber 20 into the intermediate chamber 18 through piercing holes 16, respectively, for supply. Improvements in the flowability of the monomer composition 26, that is, ocular lens component, at the time of polymerization shrinkage, polymer products can be formed with superior transcriptability within the molding cavity 22, whereby surfaces of the ocular lens material to be obtained can be made uniform and free of concave or convex portions.

Moreover, in the above described molding device, since a specified amount of monomer composition 26 is sequentially introduced and filled from external containing chamber 20 through piercing holes 16 into the intermediate chamber 18, and further through the communicating portion 24 to the molding cavity 22, in case volatilization of monomers occurs at the time of polymerization, it will only result in compositional variations of monomer composition 26 within the external containing chamber 20, whereby influences on monomer composition 26 within the intermediate chamber 18 as well as in the molding cavity 22 can be effectively restricted. In addition, the piercing holes 16 provided in the upper die base portion 8a of the upper die 8 serve as introducing holes of monomer composition and simultaneously, deaeration of aerous bodies within the intermediate chamber 18 or molding cavity 22 is performed through the piercing holes 16 at the time of introducing the monomer composition. With this arrangement, no special mechanism needs to be provided for the deaeration whereby the die arrangement can be simplified. Further, since the monomer composition 26 within the molding cavity 22 as well as the monomer composition 26 within the intermediate chamber 18 or external containing chamber 20 are be simultaneously polymerized, there is no need to provide any special means for shielding as it was necessary with conventional mold polymerization methods. There is no need to provide for special mechanism such as a moving mechanism for the molding dies or mechanism for taking out molded articles, it can largely contribute to simplification of the die arrangement.

In the above described molding device according to the present invention, it is preferable that a covering lid means is provided as to cover the upper aperture of the hollow hole 4 of the die main body 2, and further, that a space in which aerous bodies might reside is formed between the covering lid means and a liquid surface of the monomer composition 26 contained in the external containing chamber 20, examples of which are shown in FIG. 5.

Figure 5A:
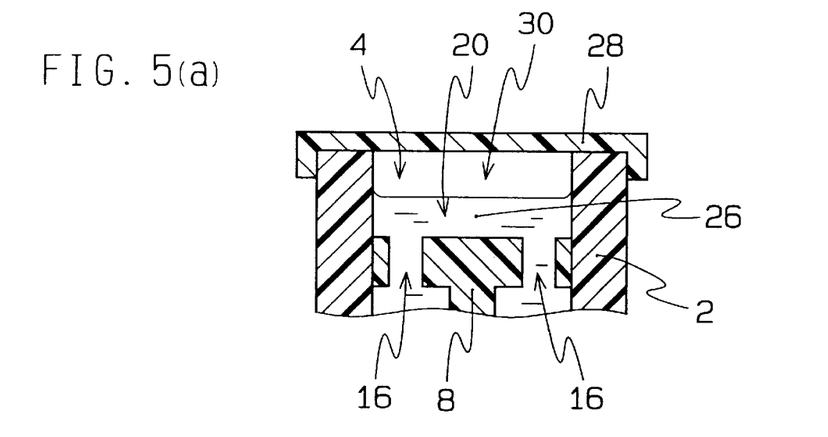
Figure 5B:
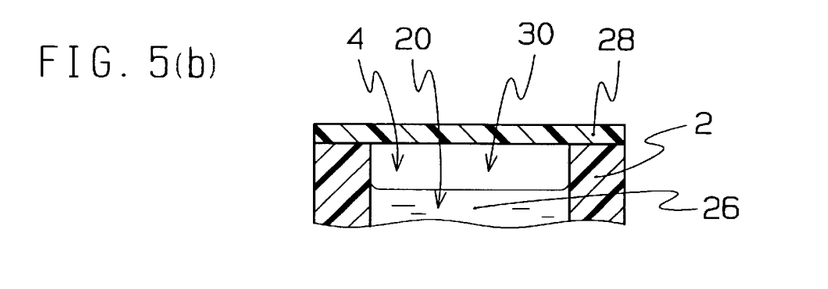
Figure 5C:
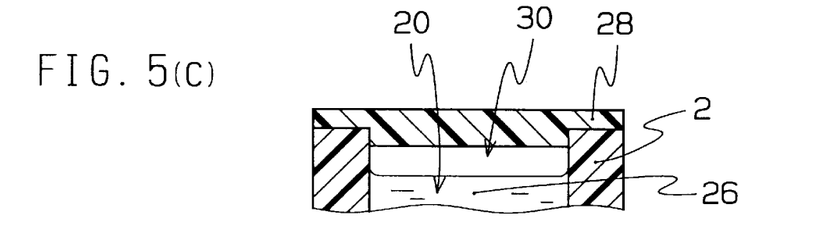
Figure 5D:
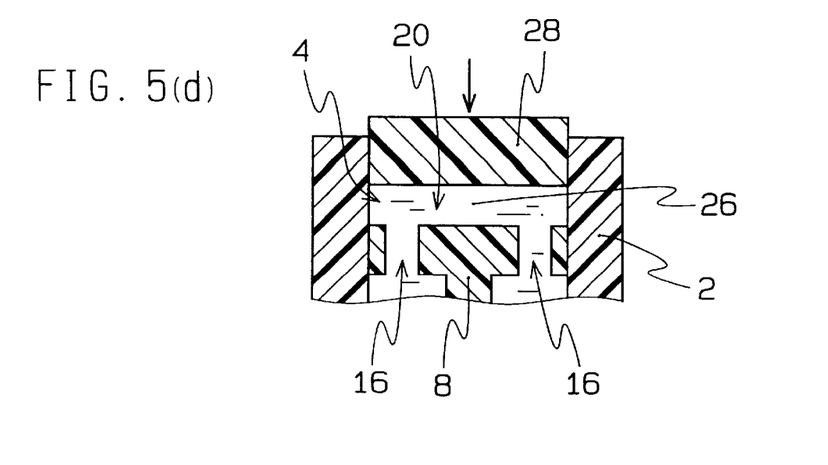

In the example shown in FIG. 5(a), a cap-like covering lid member 28 is crowned onto an upper end portion of the die main body 2 as a covering lid means, whereby the upper aperture of the hollow hole 4 is shielded with respect to the exterior and whereby a specified space 30 is formed between the covering lid member 28 and the liquid surface of the monomer composition 26 contained in the external containing chamber 20. In the example shown in FIG. 5(b), a plate-like covering lid member 28 having a specified thickness is simply mounted on an upper end surface of the die main body 2, whereby it is also possible to achieve sufficient effects of the covering lid. It is further effective to place a proper weight onto the covering lid member 28, if required, or to cover the upper end portion of the die main body 2 through a film-like covering lid member 28. Further, in the example shown in FIG. 5(c), a covering lid member 28 is attached to the upper end portion of the die main body 2 in which it is partially fitted in the hollow hole 4 to shield the upper aperture of the hollow hole 4 from the exterior. In the example of FIG. 5(d), a covering lid member 28 of which shape is substantially identical with that of the hollow hole 4 of the die main body 2 is dropped onto the monomer composition 26 contained in the exterior containing chamber 20 of the hollow hole 4 as a lid-dropping arrangement, wherein contact of the monomer composition 26 within the exterior containing chamber 20 with respect to the exterior atmosphere is intercepted by this covering lid member 28. It should be noted that the example shown in FIG. 5(d) differs from those shown in the above FIGS. 5(a) to (c) in that no space 30 is formed between the covering lid member 28 and the liquid surface of the monomer composition 26, but that rather a pressuring force is applied, as required, to the covering lid member 28 in a direction as indicated by the arrow whereby a specified pressure can be applied to the monomer composition 26.

In this manner, since the upper aperture of the hollow hole 4 of the die main body 2 is covered by the covering lid member 28 for shielding the external containing chamber 20 from the exterior, volatilization of monomer composition 26 contained in the external containing chamber 20 at the time of polymerization might be effectively restricted whereby changes in composition of the monomer composition 26 can be prevented. Thus, the composition of ocular lens material that are polymerized for molding within the molding cavity 22 will not change so that it is possible to advantageously obtain uniform ocular lens material. Further, through the provision of the space 30 between the liquid surface of the monomer composition 26 and the covering lid member 28, changes in pressure that are caused at the time of polymerization can be effectively eased through this space 30 whereby polymerization shrinkage can be neutralized to improve the flowability of the monomer composition 26 and uniform supply of monomer composition 26 into the molding cavity 22 is enabled. With this arrangement, the transcriptability of the lower die molding surface 12 of the lower die columnar portion 6b and that of the upper die molding surface 14 of the upper die columnar portion 8b that make up the molding cavity 22 is improved so that the shapes of obtained ocular lenses can be made uniform. In case no space 30 is provided, bubbles are easy dispersed within the monomer composition 26 at the time of polymerization which are also polymerized as they are so that lens materials including bubbles therein are apt to be obtained.

The monomer composition 26 that is polymerized in a mold by employing the molding device according to the present invention arranged as above described comprises one or more than two types of monomer that are known in the art for providing polymer products for obtaining ocular lens material. As also known in the art, polymerizing adjuvants such as polymerization initiators or sensitizers are suitably mixed to the monomer composition 26. The monomer composition 26 is then supplied to the molding device in a liquid state and is polymerized through known methods in a condition in which it is filled as shown in FIG. 4. Just to list some examples, there might be suitably employed a heating polymerization method in which a proper radical polymerization initiator is mixed to the monomer composition 26 and is gradually heated in a temperature range from room temperature up to approximately 100° C. or an irradiation polymerization method in which polymerization is performed by irradiating electromagnetic waves such as microwaves, ultraviolet rays or radioactive rays (gamma rays).

In case a heating polymerization method is employed for performing polymerization, it is effective to raise the temperature step-wise as known in the art, and the polymerization might alternatively be performed through bulk polymerization method or a solution polymerization method utilizing a solvent or any other known polymerization method. A radical polymerization initiator that is added to the monomer composition 26 for effective progress of the polymerization might be selected from among azobisisobutyronitrile, azobis dimethylvaleronitrile, benzoyl peroxide, tert-butylhydro peroxide, and cumene hydroperoxide, wherein the radical polymerization initiator might be used as a single or in combination of more than two types. In case of performing polymerization by employing light rays, it is referable that photo polymerization initiators or sensitizers are further added to the monomer composition 26. The mixing amount of such polymerization initiators or sensitizers that are added to the monomer composition 26 is preferably set in the range of approximately 0.002 to 10 parts by weight, and more preferably, 0.01 to 2 parts by weight with respect to 100 parts by weight of the whole polymerization component (whole amount of monomers).

In this manner, at least the lower die 6 and upper die 8 become an uniform connected object through the polymer product obtained by polymerizing the monomer composition 26 in the molding device, it is taken out from the die main body 2 to be suitably treated by mechanical processing such as cutting or die removing operations so that the targeted ocular lens material is taken out from the molding cavity 22 formed between the lower die molding surface 12 of the lower die 6 and the upper die molding surface 14 of the upper die 8. In case the obtained ocular lens material assumes a shape of a precursor of an ocular lens, the ocular lens material is further mechanically treated through cutting or grinding to obtain an ocular lens having a desired shape.

Figure 6:
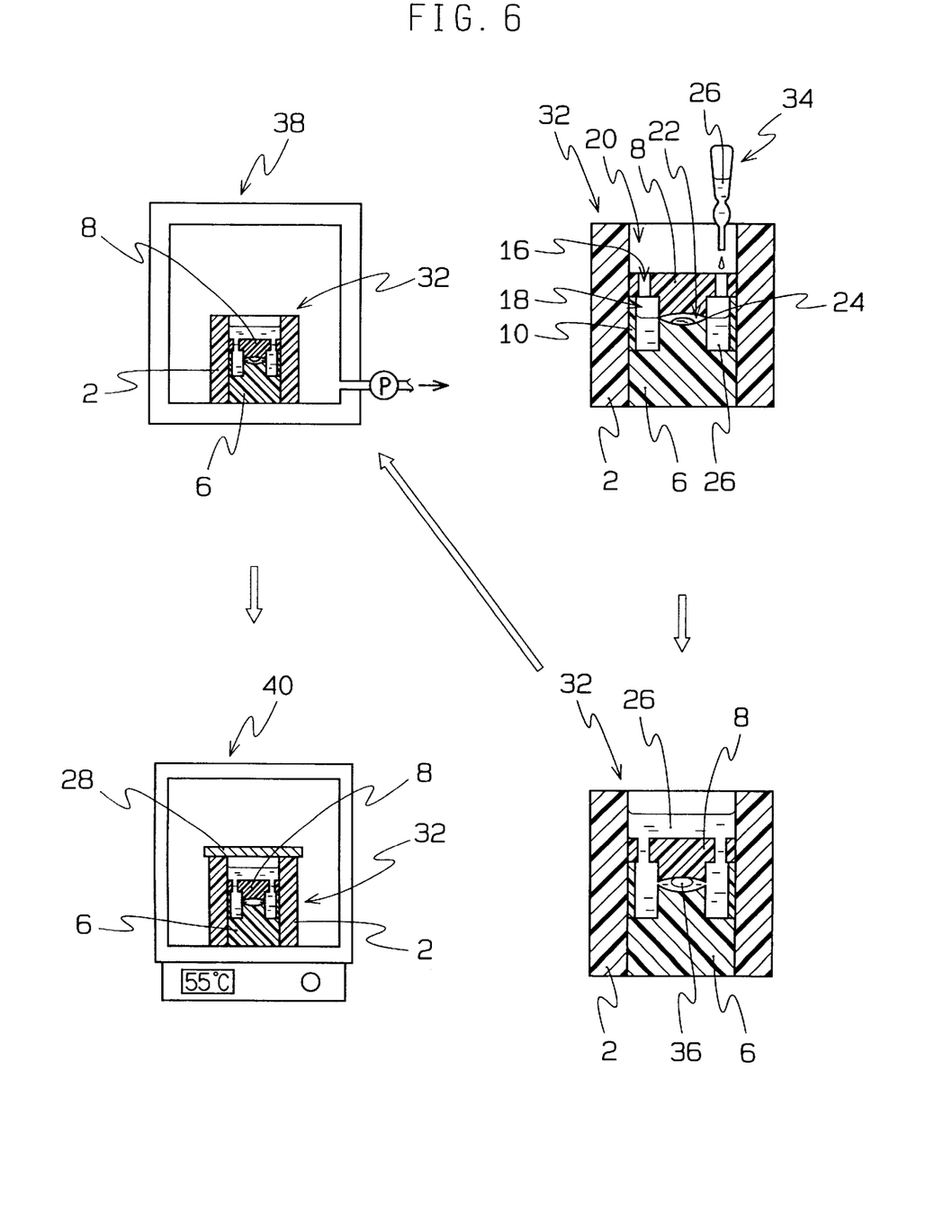
FIG. 6 is an explanatory view showing processes from filling the monomer composition up to polymerization from among mold polymerization processes employing the molding device according to the present invention.
Figure 7:
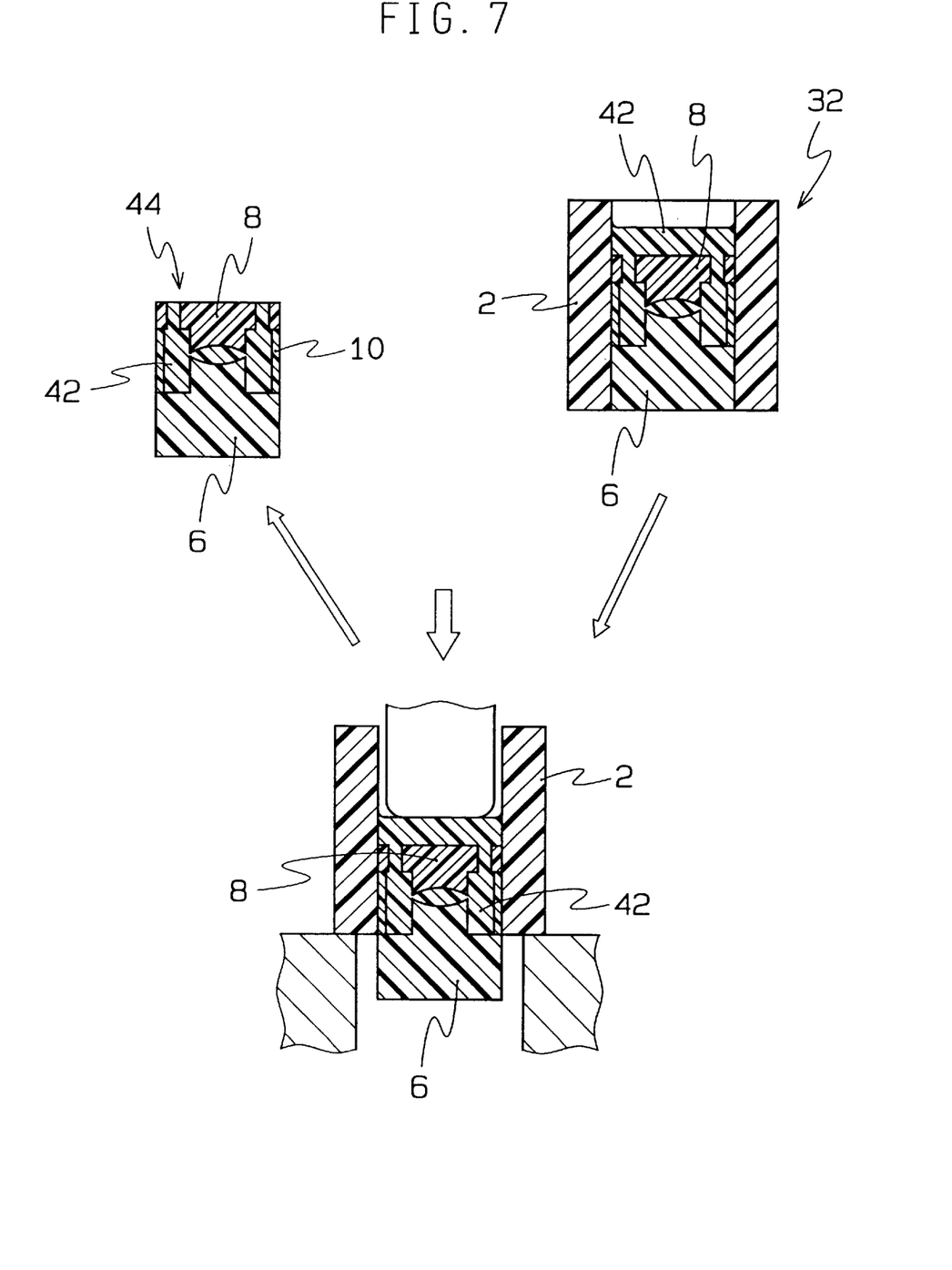
FIG. 7 is an explanatory view showing processes in which the monoblock polymerized object is forcibly pushed out from the die main body after polymerization for taking the same out from among mold polymerization processes employing the molding device according to the present invention.

In FIGS. 6 to 8, processes for manufacturing an intraocular lens according to the present invention are shown, wherein in FIG. 6, there is employed a molding device 32 formed of a die main body 2 combined with a lower die 6 and an upper die 8, and the monomer composition 26 is injected into the external containing chamber 20 through an injector 34, then introduced to the intermediate chamber 18 through piercing holes 16 and finally to the molding cavity 22 through the communicating portion 24 for filling the monomer composition 26 into the molding cavity 22 and intermediate chamber 18 and for charging the monomer composition 26 into the external containing chamber 20. Next, for removing bubbles 36 residing in the molding cavity 22, the molding device 32 is housed within a vacuum oven 38 to be exposed to decompression whereby the bubbles 36 can be removed from the molding cavity 22. The molding device 32 that has undergone decompression is heated (to, for instance, approximately 55° C.) in an heating oven 40 with the upper aperture of its die main body 2 being covered by covering lid member 28 in order to perform heat polymerization of the filled monomer composition 26, whereby a targeted polymer product 42 is formed within the molding device 32 (see FIG. 7).

After taking out the molding device 32 in which polymerization has been performed from the heating oven 40, the uniform object of the lower die 6 and the upper die 8 through polymer product 42 is forcibly removed from the die main body 2 by using power of a press machine or the like as shown in FIG. 7. A part of the polymer product 42 that has been formed in the external containing chamber 20 is removed to obtain an uniform accumulated object 44. As it is evident from the drawings, this accumulated object 44 is composed of the lower die 6, upper die 8, spacer member 10 and the polymer product 42.

Figure 8:
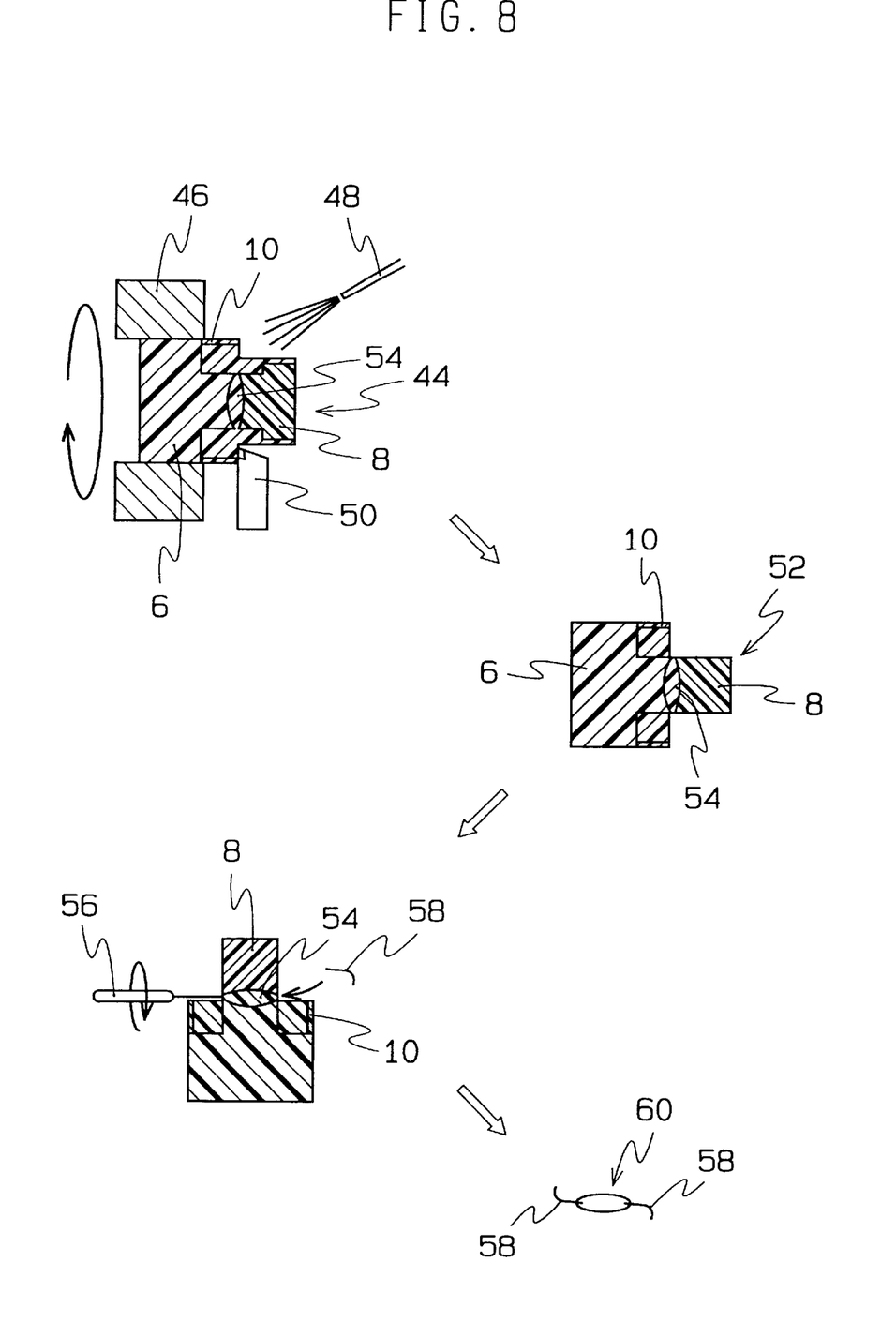
FIG. 8 is an explanatory view showing processes in which an ocular lens material is taken out from the polymerized object that has been taken out in order to finish an intraocular lens from among mold polymerization processes employing the molding device according to the present invention.

This uniform accumulated object 44 is chucked by a lathe 46 at a part of the lower die 6 and rotated as shown in FIG. 8, a cutting of a portion of outer diameter thereof using a bite 50 is performed while a coolant is sprayed thereon through a cooling spray 48, and cut from the side of the upper die 8 so as to reach a part of the molding cavity 22 and so as to be substantially equal to the outer diameter of the upper die columnar portion 8b to obtain an article 52 with a cut outer diameter. The ocular lens material 54 of the article 52 formed in the molding cavity 22 is formed with holes by using a drill 56, supporting portions 58 are attached to the attaching holes formed through the above process and fixed thereto, and by removing the lower die 6 and upper die 8 from the ocular lens material 54, the targeted intraocular lens 60 can be obtained.

For removing the ocular lens material 54 from the dies, there might be employed various methods such as immersing the same into a solution such as ethanol for swelling and removing, forcibly removing the same, or removing the same by hardening the ocular lens material 54 through cooling.

The device for molding ocular lens material and the molding method employing the same according to the present invention is not limited to the above described arrangements and methods alone, and it should be understood that anyone with knowledge of the art might perform variation, correction or improvements thereof without departing from the spirit of the present invention.

In the above described example of the molding device, the die main body 2 and lower die 6 are separately provided wherein the lower die 6 is fitted to a lower portion of the hollow hole 4 of the die main body 2 for closing the lower aperture of the hollow hole 4. The same effects would be obtained also in an alternative case in which the die main body 2 and the lower die 6 are integrally formed. Further, the lower die molding surface 12 and the upper die molding surface 14 might both assume shapes of bent concave surfaces, while at least one of them might be of a bent convex surface shape. While it is most preferable to perform mutual positioning of the lower die 6 and the upper die 8 by interposing a spacer member 10 therebetween, it goes without saying that any alternative arrangement or means might be employed so long as the upper die 8 can be positioned with respect to the lower die 6.

EMBODIMENT

The present invention will further be revealed in details based on several embodiments of the present invention, and it should be understood that the present invention is not restricted in any way by the description of these embodiments.

EXAMPLE 1

Employing a molding device as shown in FIG. 1 (it should be noted that eight piercing holes 16 are arranged at equal intervals in a circumferential direction of the upper die base portion 8a of the upper die 8), an ocular lens material 54 for providing an optical portion of intraocular lens 60 was manufactured in accordance with manufacturing processes as shown in FIGS. 6 to 8.

More particularly, a monomer composition 26 was prepared by using 70 parts by weight of phenoxy ethyl acrylate, 30 parts by weight of ethyl acrylate, 20 parts by weight of 2-hydroxyethyl metacrylate, 4 parts by weight of butanediol diacrylate as a cross linking agent and 0.83 parts by weight of 2,2'-azobis(2,4-dimethylvaleronitrile) as a radical polymerization initiator. This was supplied to the external containing chamber 20 of the molding device 32, then introduced into the intermediate chamber 18 through piercing holes 16 and further introduced into the molding cavity 22 through the communicating portion 24 and filled therein, vacuum deaerated in the vacuum oven 38, maintained in the heating oven 40 for 16 hours at 60° C., and gradually raised in temperature over 4 hours from 60 to 100° C. whereby mold polymerization of the monomer composition 26 was performed to generate a polymer product 42 within the molding device 32.

Thereafter, the uniform accumulated object 44 including the lower die 6 and the upper die 8 was forcibly pushed out from the die main body 2 by using a hydraulic press, and by cutting a portion of outer diameter with the bite 50, an article 52 with a cut outer diameter was obtained. The ocular lens material 54 formed in the molding cavity 22 for providing an optical portion of the intraocular lens was provided with holes and attached with supporting portions 58, and removing of the lower die 6 and upper die columnar portion 8b was performed through immersion into ethanol. It should be noted that this removing operation of the dies could be easily performed and the optical portion of the obtained intraocular lens 60 assumed uniform surfaces corresponding to those of the lower die molding surface 12 and the upper die molding surface 14 and presented favorable transcriptability.

EXAMPLE 2

Polymerization of monomer composition 26 in a mold was similarly performed under the same conditions as Example 1 except for the point that the number of piercing holes 16 provided in the upper die base portion 8a of the upper die 8 was set to be four (wherein these are arranged in the circumferential direction at phase differences of 90°), and the uniform accumulated product 44 thus obtained was processed into the targeted intraocular lens 60.

It was found that removing of the lower die 6 and upper die 8 (more particularly, the upper die columnar portion 8b) from the uniform accumulated product 44 could be easily performed while maintaining a favorable shape of the lens. Moreover, the optical portion of the obtained uniform intraocular lens 60 assumed a desired shape, favorable transcriptability, and was coincident with the shape of the lower die molding surface 12 and the upper die molding surface 14, and was free of drawbacks related to compositional changes owing to volatilization of monomers.

COMPARATIVE EXAMPLE 1

Polymerization of monomer composition 26 in a mold was performed under the same conditions as Example 1 except for the point that the number of the piercing hole 16 was set to one, and the optical lens material 54 was formed within the molding cavity 22 formed between the lower die molding surface 12 of the lower die 6 and the upper die molding surface 14 of the upper die 8. The ocular lens material 54 thus obtained assumed not uniform surfaces that were different from desirable shapes corresponding to the lower die molding surface 12 or the upper die molding surface 14 and presented remarkable concave and convex portions.

COMPARATIVE EXAMPLE 2

Polymerization of monomer composition 26 in a mold was performed under the same conditions as Example 1 except for the point that two piercing holes 16 were provided at a phase difference of 180°, and the targeted ocular lens material (optical portion of the intraocular lens) 54 was formed. It was found that the ocular lens material 54 thus obtained assumed not uniform surfaces that were different from desirable shapes corresponding to the lower die molding surface 12 or the upper die molding surface 14 and presented concave and convex portions.

As it is evident from comparison of the above Examples 1, 2 and Comparative Examples 1, 2, the molding device 32 of the present invention provided with not less than three piercing holes 16 was capable of producing ocular lens materials 54 of favorable transcriptability despite of its simple die arrangement. It is considered that such favorable results could be obtained in the arrangement of the molding device according to Examples 1 and 2 since the monomer composition 26 is effectively supplied to the intermediate chamber 18 or molding cavity 22 from the side of the external containing chamber 20 after the introduction of the monomer composition 26 and since uniform flowing is caused. On the other hand, in case only one or two piercing holes are provided as in Comparative Examples 1 and 2, the supply of monomer composition 26 to the intermediate chamber 18 and molding cavity 22 is not uniform which resulted in surfaces of the obtained ocular lens materials 54 that were not uniform and poor transcriptability. It is assumed that this was because the flow of monomer composition 26 to the intermediate chamber 18 and molding cavity 22 was not uniform.

The ocular lens materials (optical portions) 54 obtained in the above Examples 1, 2 and Comparative Examples 1, 2 were measured for their refracting power (diopter: D) by using a principal point refracting power measuring device through magnification method, measured for their resolution as regulated by the approved standard for intraocular lenses (Ministry of Health and Welfare, May 10, 1985, PAB (Pharmaceutical Affairs Bureau) Notification No. 489), and the resolution U (number/mm) was obtained based on the equation $U=(D \cdot d/\lambda) \times 10^3 \times 0.6$ (note that D denotes a refraction coefficient in air, d an effective diameter of the lens (3 mm), $\lambda$ a wavelength of light employed for the measurement (Hg, e line: 546.1 mm)), and respective results are indicated in the Table 1 below. As it is quite evident from this Table 1, the ocular lens materials obtained in the Examples 1 and 2 according to the invention is remarkably superior in terms of resolution as compared to those obtained in Comparative Examples 1, 2.

TABLE 1

| | Refracting Power: D (diopter) | Resolution: U (number/mm) |
|---|---|---|
| Example 1 | 62.2 | 280 |
| Example 2 | 63.7 | 225 |
| Comparative Example 1 | N.A. | N.A. |
| Comparative Example 2 | 63.2 | 160 |

As it is evident from the above description, simplification of the die arrangement of the molding device for molding ocular lens materials through polymerization in a mold can be effectively achieved in the present invention, and the flowability of monomer composition at the time of polymerization shrinkage can be effectively improved whereby the monomer composition can be uniformly supplied into the molding cavity to result in ocular lens materials of uniform surfaces, and in ocular lens materials having precise surfaces corresponding to the molding surfaces whereby the transcriptability can be remarkably improved.

INDUSTRIAL APPLICABILITY

The molding device and molding method according to the present invention is useful as having a simplified die arrangement, wherein improvements in flowability of the monomer composition of the ocular lens component at the time of polymerization shrinkage and uniform supply of such monomer composition into the molding cavity that have been enabled in the present invention result in high transcriptability of the molding cavity interior (molding surface), whereby surfaces of ocular lens material to be obtained can be made uniform.

What is claimed is:

1. A device for molding ocular lens material which is a device for molding ocular lens or ocular lens material by polymerizing liquid monomer composition of polymer products constituting these articles within a molding cavity, the device comprises:

a cylindrical main body having a hollow hole in which the monomer composition is accumulated;

a lower die composed of a lower die base portion disposed in a lower portion of the hollow hole to close the lower portion of the hollow hole of the cylindrical main body, and a lower die columnar portion that is erected to extend upward from an upper surface of the lower die base portion within the hollow hole, a surface at a top of the lower die columnar portion being formed with a lower die molding surface corresponding to one surface of the ocular lens material;

an upper die composed of an upper die base portion that is fitted into an upper portion of the hollow hole of the cylindrical main body, forming an intermediate chamber between the upper die base portion and the lower die base portion of the lower die into which the monomer composition is filled, and forming an external accumulating chamber on a side of an upper portion of the hollow hole into which the monomer composition is accumulated, and an upper die columnar portion that is erected to extend downward from a lower surface of the upper die base portion within the hollow hole, a surface at a top of the upper die columnar portion being formed with an upper die molding surface corresponding to another surface of the ocular lens material, wherein a periphery of the upper die columnar portion is spaced from the lower die columnar portion of the lower die, wherein a molding cavity is formed between the upper die molding surface of the upper die columnar portion and the lower die molding surface of the lower die columnar portion, and wherein a communicating portion is formed over a whole circumference of an exterior circumferential portion of the molding cavity through which the monomer composition is introduced from the intermediate chamber to the molding cavity, wherein not less than three piercing holes for introducing the monomer composition from the external accumulating chamber to the intermediate chamber are provided to pierce the upper die base portion of the upper die in a vertical direction and to be positioned at equal intervals around the upper die columnar portion.

2. The device of claim 1, wherein a covering lid means is provided to cover the upper portion of the hollow hole of the cylindrical main body.

3. The device of claim 2, wherein a space is formed between the covering lid means and a liquid surface of the monomer composition that is accumulated in the external accumulating chamber.

4. The device of claim 3, wherein cylindrical spacers are disposed in the hollow hole of the cylindrical main body such that they are positioned between the upper die base portion of the upper die and the lower die base portion of the lower die, so that a distance between the upper die molding surface at the tip of the upper die columnar portion and the lower die molding surface at the tip of the lower die columnar portion that are opposed with respect to each other is regulated.

5. A method for molding ocular lens material, comprising the steps of:

providing a device for molding ocular lens material which is a device for molding ocular lens or ocular lens material by polymerizing liquid monomer composition of polymer products constituting these articles within a molding cavity, the device comprises:

a cylindrical main body having a hollow hole in which the monomer composition is accumulated;

a lower die composed of a lower die base portion disposed in a lower portion of the hollow hole to close the lower portion of the hollow hole of the cylindrical main body, and a lower die columnar portion that is erected to extend upward from an upper surface of the lower die base portion within the hollow hole, a surface at a top of the lower die columnar portion being formed with a lower die molding surface corresponding to one surface of the ocular lens material;

an upper die composed of an upper die base portion that is fitted into an upper portion of the hollow hole of the cylindrical main body, forming an intermediate chamber between the upper die base portion and the lower die base portion of the lower die into which the monomer composition is filled, and forming an exterior accumulating chamber on a side of an upper portion of the hollow hole into which the monomer composition is accumulated, and an upper die columnar portion that is erected to extend downward from a lower surface of the upper die base portion within the hollow hole, a surface at a top of the upper die columnar portion being formed with an upper die molding surface corresponding to another surface of the ocular lens material, wherein a periphery of the upper die columnar portion is spaced from the lower die columnar portion of the lower die, wherein a molding cavity is formed between the upper die molding surface of the upper die columnar portion and the lower die molding surface of the lower die columnar portion, and wherein a communicating portion is formed over a whole circumference of an exterior circumferential portion of the molding cavity through which the monomer composition is introduced from the intermediate chamber to the molding cavity, wherein not less than three piercing holes for introducing the monomer composition from the external accumulating chamber to the intermediate chamber are provided to pierce the upper die base portion of the upper die in a vertical direction and to be positioned at equal intervals around the upper die columnar portion, wherein a covering lid means is provided to cover the upper portion of the hollow hole of the cylindrical main body, wherein a space in which air bubbles reside is formed between the covering lid means and a liquid surface of the monomer composition that is accumulated in the external accumulating chamber, wherein cylindrical spacers are disposed in the hollow hole of the cylindrical main body such that they are positioned between the upper die base portion of the upper die and the lower die base portion of the lower die, so that a distance between the upper die molding surface at the top of the upper die columnar portion and the lower die molding surface at the top of the lower die columnar portion that are opposed with respect to each other is regulated;

filling the monomer composition into the molding cavity and intermediate chamber by supplying the monomer composition into the hollow hole of the cylindrical main body so as to introduce the monomer composition from the external accumulating chamber to the intermediate chamber through the piercing holes and from the intermediate chamber to the molding cavity through the communicating portion and to accumulate the monomer composition into the external accumulating chamber;

polymerizing the monomer composition residing in the molding cavity, intermediate chamber, and external accumulating chamber to obtain an uniform polymerized object; and taking out the ocular lens material formed in the molding cavity from the polymerized object thereafter.

6. The method of claim 5, wherein the polymerizing step is performed under a condition in which a space in which air bubbles reside is formed above a liquid surface of the monomer composition accumulated in the external accumulating chamber.

7. The method of claim 6, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

8. The method of claim 5, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

9. The device of claim 1, wherein cylindrical spacers are disposed in the hollow hole of the cylindrical main body such that they are positioned between the upper die base portion of the upper die and the lower die base portion of the lower die, so that a distance between the upper die molding surface at the tip of the upper die columnar portion and the lower die molding surface at the top of the lower die columnar portion that are opposed with respect to each other is regulated.

10. A method for molding ocular lens material, comprising the steps of:

providing a device for molding ocular lens material which is a device for molding ocular lens or ocular lens material by polymerizing liquid monomer composition of polymer products constituting these articles within a molding cavity, the device comprises:

a cylindrical main body having a hollow hole in which the monomer composition is accumulated;

a lower die composed of a lower die base portion disposed in a lower portion of the hollow hole to close the lower portion of the hollow hole of the cylindrical main body, and a lower die columnar portion that is erected to extend upward from an upper surface of the lower die base portion within the hollow hole, a surface at a top of the lower die columnar portion being formed with a lower die molding surface corresponding to one surface of the ocular lens material;

an upper die composed of
a upper die base portion that is fitted into an upper portion of the hollow hole of the cylindrical main body, forming an intermediate chamber between the upper die base portion and the lower die base portion of the lower die into which the monomer composition is filled, and forming an exterior accumulating chamber on a side of an upper portion of the hollow hole into which the monomer composition is accumulated, and an upper die columnar portion that is erected to extend downward from a lower surface of the upper die base portion within the hollow hole, a surface at a top of the upper die columnar portion being formed with an upper die molding surface corresponding to another surface of the ocular lens material, wherein a periphery of the upper die columnar portion is spaced from the lower die columnar portion of the lower die, wherein a molding cavity is formed between the upper die molding surface of the upper die columnar portion and the lower die molding surface of the lower die columnar portion, and wherein a communicating portion is formed over a whole circumference of an exterior circumferential portion of the molding cavity through which the monomer composition is introduced from the intermediate chamber to the molding cavity, wherein not less than three piercing holes for introducing the monomer composition from the external accumulating chamber to the intermediate chamber are provided to pierce the upper die base portion of the upper die in a vertical direction and to be positioned at equal intervals around the upper die columnar portion wherein cylindrical spacers are disposed in the hollow hole of the cylindrical main body such that they are positioned between the upper die base portion of the upper die and the lower die base portion of the lower die, so that a distance between the upper die molding surface at the top of the upper die columnar portion and the lower die molding surface at the top of the lower die columnar portion that are opposed with respect to each other is regulated;

filling the monomer composition into the molding cavity and intermediate chamber by supplying the monomer composition into the hollow hole of the cylindrical main body so as to introduce the monomer composition from the external accumulating chamber to the intermediate chamber through the piercing holes and from the intermediate chamber to the molding cavity through the communicating portion and to accumulate the monomer composition into the external accumulating chamber;

polymerizing the monomer composition residing in the molding cavity, intermediate chamber, and external accumulating chamber to obtain an uniform polymerized object; and taking out the ocular lens material formed in the molding cavity from the polymerized object thereafter.

11. The method of claim 10, wherein the polymerizing step is performed under a condition in which a space in which air bubbles reside is formed above a liquid surface of the monomer composition accumulated in the external accumulating chamber.

12. The method of claim 11, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

13. The method of claim 10, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

14. The device of claim 2, wherein cylindrical spacers are disposed in the hollow hole of the cylindrical main body such that they are positioned between the upper die base portion of the upper die and the lower die base portion of the lower die, so that a distance between the upper die molding surface at the top of the upper die columnar portion and the lower die molding surface at the top of the lower die columnar portion that are opposed with respect to each other is regulated.

15. A method for molding ocular lens material, comprising the steps of:
   providing a device for molding ocular lens material which is a device for molding ocular lens or ocular lens material by polymerizing liquid monomer composition of polymer products constituting these articles within a molding cavity, the device comprises:
      a cylindrical main body having a hollow hole in which the monomer composition is accumulated;
      a lower die composed of a lower die base portion disposed in a lower portion of the hollow hole to close the lower portion of the hollow hole of the cylindrical main body, and a lower die columnar portion that is erected to extend upward from an upper surface of the lower die base portion within the hollow hole, a surface at a top of the lower die columnar portion being formed with a lower die molding surface corresponding to one surface of the ocular lens material;
      an upper die composed of
         a upper die base portion that is fitted into an upper portion of the hollow hole of the cylindrical main body, forming an intermediate chamber between the upper die base portion and the lower die base portion of the lower die into which the monomer composition is filled, and forming an exterior accumulating chamber on a side of an upper portion of the hollow hole into which the monomer composition is accumulated, and
         an upper die columnar portion that is erected to extend downward from a lower surface of the upper die base portion within the hollow hole, a surface at a top of the upper die columnar portion being formed with an upper die molding surface corresponding to another surface of the ocular lens material, wherein a periphery of the upper die columnar portion is spaced from the lower die columnar portion of the lower die, wherein a molding cavity is formed between the upper die molding surface of the upper die columnar portion and the lower die molding surface of the lower die columnar portion, and wherein a communicating portion is formed over a whole circumference of an exterior circumferential portion of the molding cavity through which the monomer composition is introduced from the intermediate chamber to the molding cavity,
      wherein not less than three piercing holes for introducing the monomer composition from the external accumulating chamber to the intermediate chamber are provided to pierce the upper die base portion of the upper die in a vertical direction and to be positioned at equal intervals around the upper die columnar portion
      wherein a covering lid means is provided to cover the upper portion of the hollow hole of the cylindrical main body,
      wherein cylindrical spacers are disposed in the hollow hole of the cylindrical main body such that they are positioned between the upper die base portion of the upper die and the lower die base portion of the lower die, so that a distance between the upper die molding surface at the top of the upper die columnar portion and the lower die molding surface at the top of the lower die columnar portion that are opposed with respect to each other is regulated;
   filling the monomer composition into the molding cavity and intermediate chamber by supplying the monomer composition into the hollow hole of the cylindrical main body so as to introduce the monomer composition from the external accumulating chamber to the intermediate chamber through the piercing holes and from the intermediate chamber to the molding cavity through the communicating portion and to accumulate the monomer composition into the external accumulating chamber;
   polymerizing the monomer composition residing in the molding cavity, intermediate chamber, and external accumulating chamber to obtain an uniform polymerized object; and
   taking out the ocular lens material formed in the molding cavity from the polymerized object thereafter.

16. The method of claim 15, wherein the polymerizing step is performed under a condition in which a space in which air bubbles reside is formed above a liquid surface of the monomer composition accumulated in the external accumulating chamber.

17. The method of claim 16, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

18. The method of claim 15, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

19. A method for molding ocular lens material, comprising the steps of:
   providing a device for molding ocular lens material which is a device for molding ocular lens or ocular lens material by polymerizing liquid monomer composition of polymer products constituting these articles within a molding cavity the device comprises:
   a cylindrical main body having a hollow hole in which the monomer composition is accumulated;

a lower die composed of a lower die base portion disposed in a lower portion of the hollow hole to close the lower portion of the hollow hole of the cylindrical main body, and a lower die columnar portion that is erected to extend upward from an upper surface of the lower die base portion within the hollow hole, a surface at a top of the lower die columnar portion being formed with a lower die molding surface corresponding to one surface of the ocular lens material;

an upper die composed of
  a upper die base portion that is fitted into an upper portion of the hollow hole of the cylindrical main body, forming an intermediate chamber between the upper die base portion and the lower die base portion of the lower die into which the monomer composition is filled, and forming an exterior accumulating chamber on a side of an upper portion of the hollow hole into which the monomer composition is accumulated, and
  an upper die columnar portion that is erected to extend downward from a lower surface of the upper die base portion within the hollow hole, a surface at a top of the upper die columnar portion being formed with an upper die molding surface corresponding to another surface of the ocular lens material, wherein a periphery of the upper die columnar portion is spaced from the lower die columnar portion of the lower die, wherein a molding cavity is formed between the upper die molding surface of the upper die columnar portion and the lower die molding surface of the lower die columnar portion and wherein a communicating portion is formed over a whole circumference of an exterior circumferential portion of the molding cavity through which the monomer composition is introduced from the intermediate chamber to the molding cavity, wherein not less than three piercing holes for introducing the monomer composition from the external accumulating chamber to the intermediate chamber are provided to pierce the upper die base portion of the upper die in a vertical direction and to be positioned at equal intervals around the upper die columnar portion, wherein a covering lid means is provided to cover the upper portion of the hollow hole of the cylindrical main body;

filling the monomer composition into the molding cavity and intermediate chamber by supplying the monomer composition into the hollow hole of the cylindrical main body so as to introduce the monomer composition from the external accumulating chamber to the intermediate chamber through the piercing holes and from the intermediate chamber to the molding cavity through the communicating portion and to accumulate the monomer composition into the external accumulating chamber;

polymerizing the monomer composition residing in the molding cavity, intermediate chamber, and external accumulating chamber to obtain an uniform polymerized object; and taking out the ocular lens material formed in the molding cavity from the polymerized object thereafter.

20. The method of claim 19, wherein the polymerizing step is performed under a condition in which a space in which air bubbles reside is formed above a liquid surface of the monomer composition accumulated in the external accumulating chamber.

21. The method of claim 20, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

22. The method of claim 19, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

23. A method for molding ocular lens material, comprising the steps of:
  providing a device for molding ocular lens material which is a device for molding ocular lens or ocular lens material by polymerizing liquid monomer composition of polymer products constituting these articles within a molding cavity, the device comprises:
    a cylindrical main body having a hollow hole in which the monomer composition is accumulated;
    a lower die composed of a lower die base portion disposed in a lower portion of the hollow hole to close the lower portion of the hollow hole of the cylindrical main body, and a lower die columnar portion that is erected to extend upward from an upper surface of the lower die base portion within the hollow hole, a surface at a top of the lower die columnar portion being formed with a lower die molding surface corresponding to one surface of the ocular lens material;
    an upper die composed of
      a upper die base portion that is fitted into an upper portion of the hollow hole of the cylindrical main body, forming an intermediate chamber between the upper die base portion and the lower die base portion of the lower die into which the monomer composition is filled, and forming an exterior accumulating chamber on a side of an upper portion of the hollow hole into which the monomer composition is accumulated, and
      an upper die columnar portion that is erected to extend downward from a lower surface of the upper die base portion within the hollow hole, a surface at a top of the upper die columnar portion being formed with an upper die molding surface corresponding to another surface of the ocular lens material, wherein a periphery of the upper die columnar portion is spaced from the lower die columnar portion of the lower die, wherein a molding cavity is formed between the upper die molding surface of the upper die columnar portion and the lower die molding surface of the lower die columnar portion, and wherein a communicating portion is formed over a whole circumference of an exterior circumferential portion of the molding cavity through which the monomer composition is introduced from the intermediate chamber to the molding cavity,
    wherein not less than three piercing holes for introducing the monomer composition from the external accumulating chamber to the intermediate chamber are provided to pierce the upper die base portion of the upper die in a vertical direction and to be positioned at equal intervals around the upper die columnar portion;

filling the monomer composition into the molding cavity and intermediate chamber by supplying the monomer composition into the hollow hole of the cylindrical main body so as to introduce the monomer composition from the external accumulating chamber to the intermediate chamber through the piercing holes and from the intermediate chamber to the molding cavity through the communicating portion and to accumulate the monomer composition into the external accumulating chamber;

polymerizing the monomer composition residing in the molding cavity, intermediate chamber, and external accumulating chamber to obtain an uniform polymerized object; and taking out the ocular lens material formed in the molding cavity from the polymerized object thereafter.

24. The method of claim 23, wherein the polymerizing step is performed under a condition in which a space in which air bubbles reside is formed above a liquid surface of the monomer composition accumulated in the external accumulating chamber.

25. The method of claim 24, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

26. The method of claim 23, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

27. A method for molding ocular lens material, comprising the steps of:

providing a device for molding ocular lens material which is a device for molding ocular lens or ocular lens material by polymerizing liquid monomer composition of polymer products constituting these articles within a molding cavity, the device comprises:

a cylindrical main body having a hollow hole in which the monomer composition is accumulated;

a lower die composed of a lower die base portion disposed in a lower portion of the hollow hole to close the lower portion of the hollow hole of the cylindrical main body, and a lower die columnar portion that is erected to extend upward from an upper surface of the lower die base portion within the hollow hole, a surface at a top of the lower die columnar portion being formed with a lower die molding surface corresponding to one surface of the ocular lens material;

an upper die composed of a upper die base portion that is fitted into an upper portion of the hollow hole of the cylindrical main body, forming an intermediate chamber between the upper die base portion and the lower die base portion of the lower die into which the monomer composition is filled, and forming an exterior accumulating chamber on a side of an upper portion of the hollow hole into which the monomer composition is accumulated, and an upper die columnar portion that is erected to extend downward from a lower surface of the upper die base portion within the hollow hole, a surface at a top of the upper die columnar portion being formed with an upper die molding surface corresponding to another surface of the ocular lens material, wherein a periphery of the upper die columnar portion is spaced from the lower die columnar portion of the lower die, wherein a molding cavity is formed between the upper die molding surface of the upper die columnar portion and the lower die molding surface of the lower die columnar portion, and wherein a communicating portion is formed over a whole circumference of an exterior circumferential portion of the molding cavity through which the monomer composition is introduced from the intermediate chamber to the molding cavity, wherein not less than three piercing holes for introducing the monomer composition from the external accumulating chamber to the intermediate chamber are provided to pierce the upper die base portion of the upper die in a vertical direction and to be positioned at equal intervals around the upper die columnar portion, wherein a covering lid means is provided to cover the upper portion of the hollow hole of the cylindrical main body, wherein a space in which air bubbles reside is formed between the covering lid means and liquid surface of the monomer composition that is accumulated in the external accumulating chamber;

filling the monomer composition into the molding cavity and intermediate chamber by supplying the monomer composition into the hollow hole of the cylindrical main body so as to introduce the monomer composition from the external accumulating chamber to the intermediate chamber through the piercing holes and from the intermediate chamber to the molding cavity through the communicating portion and to accumulate the monomer composition into the external accumulating chamber;

polymerizing the monomer composition residing in the molding cavity, intermediate chamber, and external accumulating chamber to obtain an uniform polymerized object; and taking out the ocular lens material formed in the molding cavity from the polymerized object thereafter.

28. The method of claim 27, wherein the polymerizing step is performed under a condition in which a space in which air bubbles reside is formed above a liquid surface of the monomer composition accumulated in the external accumulating chamber.

29. The method of claim 28, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

30. The method of claim 27, wherein the intermediate chamber and molding cavity are maintained at a decompressed condition after being introduced with the monomer composition and preceding the polymerizing step, whereby at least bubbles residing in the molding cavity are removed to eliminate generation of deficiencies of molding due to the presence of such bubbles.

* * * * *